United States Patent
Yu et al.

(10) Patent No.: US 10,643,305 B2
(45) Date of Patent: May 5, 2020

(54) COMPRESSION METHOD AND APPARATUS FOR PANORAMIC STEREO VIDEO SYSTEM

(71) Applicant: SHANGHAITECH UNIVERSITY, Shanghai (CN)

(72) Inventors: Jingyi Yu, Shanghai (CN); Yi Ma, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 16/069,185

(22) PCT Filed: Jan. 18, 2016

(86) PCT No.: PCT/CN2016/071238
§ 371 (c)(1),
(2) Date: Jul. 11, 2018

(87) PCT Pub. No.: WO2017/120981
PCT Pub. Date: Jul. 20, 2017

(65) Prior Publication Data
US 2019/0028707 A1    Jan. 24, 2019

(30) Foreign Application Priority Data

Jan. 12, 2016  (WO) ............. PCT/CN2016/070712
Jan. 13, 2016  (WO) ............. PCT/CN2016/070823

(51) Int. Cl.
*H04N 13/243*  (2018.01)
*H04N 13/246*  (2018.01)
(Continued)

(52) U.S. Cl.
CPC .......... *G06T 3/4038* (2013.01); *G06K 9/6202* (2013.01); *G06T 3/0093* (2013.01);
(Continued)

(58) Field of Classification Search
CPC .................................................. G06T 3/4038
See application file for complete search history.

(56) References Cited

U.S. PATENT DOCUMENTS 8,228,560 B2    7/2012  Hooper
9,338,439 B2    5/2016  Grossmann et al.
(Continued)

FOREIGN PATENT DOCUMENTS

CN     102055982 A     5/2011
CN     102243432 A     11/2011
(Continued)

OTHER PUBLICATIONS

PCT International Search Report and the Written Opinion dated Sep. 22, 2016, issued in related International Application No. PCT/CN2016/070823 (6 pages).
(Continued)

*Primary Examiner* — Irfan Habib
(74) *Attorney, Agent, or Firm* — Sheppard Mullin Richter & Hampton LLP

(57) ABSTRACT

A method of compressing a stereoscopic video including a left view frame and a right view frame is provided, the method including: determining a texture saliency value for a first block in the left view frame by intra prediction (1101); determining a motion saliency value for the first block by motion estimation (1102); determining a disparity saliency value between the first block and a corresponding second block in the right view frame (1103); determining a quantization parameter based on the disparity saliency value, the texture saliency value, and the motion saliency value (1104); and performing quantization of the first block in accordance with the quantization parameter (1105).

14 Claims, 7 Drawing Sheets

(51) Int. Cl.

| | | |
|---|---|---|
| *H04N 13/282* | (2018.01) | |
| *G06T 3/40* | (2006.01) | |
| *H04N 13/239* | (2018.01) | |
| *G06T 7/73* | (2017.01) | |
| *G06T 7/80* | (2017.01) | |
| *G06T 7/33* | (2017.01) | |
| *H04N 19/126* | (2014.01) | |
| *H04N 19/159* | (2014.01) | |
| *H04N 19/176* | (2014.01) | |
| *H04N 19/523* | (2014.01) | |
| *H04N 13/106* | (2018.01) | |
| *H04N 13/128* | (2018.01) | |
| *G06K 9/62* | (2006.01) | |
| *G06T 3/00* | (2006.01) | |
| *H04N 5/232* | (2006.01) | |
| *H04N 13/00* | (2018.01) | |

(52) U.S. Cl.
CPC ............... *G06T 3/40* (2013.01); *G06T 7/337* (2017.01); *G06T 7/74* (2017.01); *G06T 7/85* (2017.01); *H04N 5/23238* (2013.01); *H04N 13/106* (2018.05); *H04N 13/128* (2018.05); *H04N 13/239* (2018.05); *H04N 13/243* (2018.05); *H04N 13/246* (2018.05); *H04N 13/282* (2018.05); *H04N 19/126* (2014.11); *H04N 19/159* (2014.11); *H04N 19/176* (2014.11); *H04N 19/523* (2014.11); *G06T 2207/10021* (2013.01); *H04N 2013/0081* (2013.01)

(56) References Cited

U.S. PATENT DOCUMENTS

| | | | |
|---|---|---|---|
| 9,392,274 | B2 | 7/2016 | Wang et al. |
| 9,870,617 | B2* | 1/2018 | Piekniewski ......... G06K 9/4671 |
| 10,095,953 | B2* | 10/2018 | Smolic ............... G06K 9/52 |
| 10,313,656 | B2 | 6/2019 | Sadi et al. |
| 10,477,182 | B2 | 11/2019 | Schwarz et al. |
| 2002/0145660 | A1 | 10/2002 | Kanade et al. |
| 2004/0001138 | A1 | 1/2004 | Weerashinghe et al. |
| 2004/0189674 | A1 | 9/2004 | Zhang et al. |
| 2007/0052794 | A1 | 3/2007 | Ha et al. |
| 2008/0002023 | A1* | 1/2008 | Cutler ................. G06T 3/4038 348/36 |
| 2011/0069148 | A1 | 3/2011 | Jones et al. |
| 2011/0109720 | A1* | 5/2011 | Smolic ............... H04N 13/111 348/43 |
| 2011/0235706 | A1 | 9/2011 | Demircin et al. |
| 2011/0255589 | A1 | 10/2011 | Saunders et al. |
| 2012/0154518 | A1 | 6/2012 | Zargarpour et al. |
| 2012/0236934 | A1 | 9/2012 | Chen et al. |
| 2012/0249730 | A1 | 10/2012 | Lee |
| 2013/0044186 | A1 | 2/2013 | Jin et al. |
| 2013/0057644 | A1* | 3/2013 | Stefanoski ............ G06T 5/50 348/42 |
| 2013/0063549 | A1 | 3/2013 | Schnyder et al. |
| 2013/0176390 | A1 | 7/2013 | Chen et al. |
| 2014/0098185 | A1 | 4/2014 | Davari et al. |
| 2014/0125771 | A1 | 5/2014 | Grossmann et al. |
| 2014/0218550 | A1 | 8/2014 | Chuang et al. |
| 2014/0300691 | A1 | 10/2014 | Saito et al. |
| 2014/0307045 | A1 | 10/2014 | Richardt et al. |
| 2014/0313191 | A1* | 10/2014 | Bruls ............... H04N 13/128 345/419 |
| 2014/0355685 | A1 | 12/2014 | Chen et al. |
| 2015/0145965 | A1 | 5/2015 | Livyatan et al. |
| 2015/0169983 | A1* | 6/2015 | Kang ................. G06K 9/4676 382/154 |
| 2015/0227810 | A1* | 8/2015 | Perazzi ............... H04N 19/117 382/107 |
| 2015/0348273 | A1* | 12/2015 | Chapiro ............... G06K 9/52 348/54 |
| 2015/0348580 | A1 | 12/2015 | van Hoff et al. |
| 2015/0381988 | A1* | 12/2015 | Gu ................. H04N 19/147 375/240.12 |
| 2019/0102863 | A1* | 4/2019 | Sun ................. G06F 16/434 |
| 2019/0141311 | A1* | 5/2019 | Lee ................. H04N 21/816 |
| 2020/0020076 | A1* | 1/2020 | Cook ................. G06T 3/4038 |

FOREIGN PATENT DOCUMENTS

| | | |
|---|---|---|
| CN | 102547357 A | 7/2012 |
| CN | 103020985 A | 4/2013 |
| CN | 103108187 A | 5/2013 |
| CN | 103179405 A | 6/2013 |
| CN | 103516995 A | 1/2014 |
| CN | 104169965 A | 11/2014 |
| CN | 104247432 A | 12/2014 |
| CN | 104255027 A | 12/2014 |
| CN | 104424642 A | 3/2015 |
| CN | 104580933 A | 4/2015 |
| CN | 104822058 A | 8/2015 |
| CN | 105049850 A | 11/2015 |
| CN | 106797459 A | 5/2017 |
| CN | 106797460 A | 5/2017 |
| EP | 1679659 A1 | 7/2006 |
| EP | 2736013 A2 | 5/2014 |
| EP | 2793187 A1 | 10/2014 |
| EP | 2695385 B1 | 12/2015 |
| WO | 2010085361 A2 | 7/2010 |
| WO | 2012-136388 A1 | 10/2012 |
| WO | 2012/136388 A1 | 10/2012 |
| WO | 2013/151883 A1 | 10/2013 |
| WO | 2015/085406 A1 | 6/2015 |
| WO | 2015-085406 A1 | 6/2015 |
| WO | 2015/179574 A1 | 11/2015 |
| WO | 2016/048017 A1 | 3/2016 |
| WO | 2018/064110 A1 | 4/2018 |

OTHER PUBLICATIONS

PCT International Preliminary Report on Patentability dated Jul. 26, 2018, issued in related International Application No. PCT/CN2016/070823 (5 pages).

PCT International Search Report and the Written Opinion dated Oct. 17, 2016, issued in related International Application No. PCT/CN2016/071238 (7 pages).

PCT International Preliminary Report on Patentability dated Jul. 26, 2018, issued in related International Application No. PCT/CN2016/071238 (5 pages).

PCT International Search Report and the Written Opinion dated Oct. 19, 2016, issued in related International Application No. PCT/CN2016/070712 (6 pages).

PCT International Preliminary Report on Patentability dated Jul. 26, 2018, issued in related International Application No. PCT/CN2016/070712 (5 pages).

Kun Feng et al., "A Bit Allocation Method for Multi-view Video Coding Based on Stereoscopic Visual Saliency", *Journal of Optoelectronics • Laser*, vol. 24, No. 10, Oct. 31, 2013, pp. 1995-2001.

Haksub Kim et al., "Saliency Prediction on Stereoscopic Videos", *IEEE Transactions on Image Processing*, vol. 23, No. 4, Apr. 30, 2014, pp. 1476-1490.

Extended European Search Report dated May 10, 2019, issued in European Application No. 16884543.6 (12 pages).

Heiko Schwarz et al., "Description of 3D Video Coding Technology Proposal by Fraunhofer HHI (HEVC compatible, configuration B", MPEG Meeting, International Organisation for Standardisation, ISO/IE JT1/SC29/WG11, Coding of Moving Pictures and Audio, Nov. 22, 2011 (46 pages).

Minghui Wang et al., "Region-of-interest based dynamical parameter allocation for H.264/AVC encoder", Picture Coding Symposium, May 6, 2009 (4 pages).

First Search dated Jan. 15, 2020, issued in related Chinese Patent Application No. 201680078524.X (2 pages).

(56) References Cited

OTHER PUBLICATIONS

First Office Action dated Jan. 22, 2020, issued in related Chinese Patent Application No. 201680078524.X, with English machine translation (29 pages).
First Search dated Dec. 20, 2019, issued in related Chinese Patent Application No. 201680078558.9 (2 pages).
First Office Action dated Dec. 30, 2019, issued in related Chinese Patent Application No. 201680078558.9, with English machine translation (8 pages).
Extended European Search Report dated Jul. 22, 2019, issued in related European Patent Application No. 16884339.9 (11 pages).
Bo LI et al., "A Multiple-Camera System Calibration Toolbox Using a Featured Descriptor-Based Calibration Pattern", 2013 IEEE/RSJ International Conference on Intelligent Robots and Systems, IEEE, Nov. 3, 2013, pp. 1301-1307.
Extended European Search Report dated Sep. 11, 2019, issued in related European Application No. 16884365.4 (9 pages).

* cited by examiner

COMPRESSION METHOD AND APPARATUS FOR PANORAMIC STEREO VIDEO SYSTEM

CROSS-REFERENCE TO RELATED APPLICATIONS

This application is a National Phase application under 35 U.S.C. § 371 of PCT Application No. PCT/CN2016/071238, filed Jan. 18, 2016, which application claims priority benefit to PCT Application No. PCT/CN2016/070823, filed Jan. 13, 2016, which application claims priority benefit to PCT Application No. PCT/CN2016/070712, filed Jan. 12, 2016. The entire contents of all of the above-referenced applications are hereby incorporated herein by reference.

TECHNICAL FIELD

The present invention relates to panoramic stereo video systems for capturing, processing, compressing, and displaying 3D panoramic stereo videos, and more particularly, to methods and apparatus for compressing 3D panoramic stereo videos in the panoramic stereo video systems.

BACKGROUND

In the proposed panoramic stereo video system, the stereo panorama videos are shown on head mounted displays (HMD) to provide an immersed 3D experience. Two essential features that determine user experience are resolution and persistence of the stereo video. In the proposed system, the stereo videos are stitched from 16 high resolution (HD) cameras, and the resolution is at least 3840×2160 (4K) for each view. With a frame rate of 50 fps, the proposed system can substantially reduce motion blurring and flicking affects. However, the super high resolution and high refresh rate generate tremendous amount of video data, which is a challenge for 3D video services and broadcasting.

Modern hybrid video coding methods, such as H.264, VC-1 and HEVC, have achieved significant improvement in video coding efficiency in the last decade. Spatial and temporal redundancy in video sequences has been dramatically decreased by employing intensive spatial-temporal prediction. Recent 3D extensions, such as MV-HEVC and 3D-HEVC, have further investigated disparity prediction between different views. However, to achieve better compression performance for stereo panorama videos, human visual characteristics and panorama-specific characteristics need to be further considered to improve subjective video quality.

Generally speaking, 360-degree panoramic image contains an elongated field of view, and there is a high probability that most of the field of view is background. Users are more likely to pay attention to only a small part of field with significant contrast of color, texture, movement, or depth.

The basic idea behind human visual characteristics based compression method is to only encode a small number of selected attention regions with high priority to obtain a high subjective video quality, while treating less interesting regions with low priority to save bits. To achieve this, an attention prediction method is often used to predict which regions that the user will likely to pay attention to.

Currently, 2D image saliency computation mainly considers the features contrast, such as color, shape, orientation, texture, curvedness, etc. In image sequences or videos, region of interesting detection is focused on motion information to separate the foreground from the background. However, the current compression methods for videos are not suitable for stereo videos, as they do not consider the stereopsis contracts in the stereo videos. Moreover, when salient objects do not exhibit visual uniqueness in spatial and movement in temporal, the ROI become challenging for existing methods to detect.

Therefore, there is a need to provide a new compression method for stereo videos where the texture, motion and stereopsis contrast are explored in the same time for saliency analysis.

SUMMARY OF THE INVENTION

To address issues in the prior art, embodiments of the present invention provide a new compression method for stereo videos where the texture, motion and stereopsis contrast are explored in the same time for saliency analysis. Specifically, block-based stereopsis detection is employed to provide an additional depth cue, which plays an important role in human vision.

In accordance with an embodiment of the present invention, a method of compressing a stereoscopic video comprising a left view frame and a right view frame is provided, the method comprising: determining a texture saliency value for a first block in the left view frame by intra prediction; determining a motion saliency value for the first block by motion estimation; determining a disparity saliency value between the first block and a corresponding second block in the right view frame; and determining a quantization parameter based on the disparitysaliency value, the texture saliency value, and the motion saliency value.

Preferably, the method further comprises performing quantization of the first block in accordance with the quantization parameter.

Preferably, the method further comprises determining a hybrid stereo saliency map for the left view frame; downscaling the hybrid stereo saliency map to match the dimension of a transform unit (TU); determining a second quantization parameter for the transform unit; and performing quantization of the transform unit in accordance with the second quantization parameter.

Preferably, the method further comprises determining the texture saliency value based on output of a DC mode intra prediction in high efficiency video coding (HEVC).

Preferably, the method further comprises determining a motion saliency value for the first block based on output of motion estimation in high efficiency video coding (HEVC).

Preferably, the method further comprises determining the hybrid stereo saliency value for the first block by superposing the disparity saliency value, the texture saliency value, and the motion saliency value with weighting parameters.

Preferably, the left view frame and the right view frame are rectified in a first direction, and the method further comprises searching the disparity saliency value in a second direction perpendicular to the first direction.

Preferably, the disparity saliency value comprises a non-integer value.

Preferably, the method further comprises determining the disparity saliency value based on quarter-pixel samples generated by sub-pixel motion estimation in high efficiency video coding (HEVC).

In accordance with another embodiment of the present invention, a non-transitory computer-readable medium having stored thereon computer-executable instructions, said computer-executable instructions comprising a method of compressing a stereoscopic video comprising a left view frame and a right view frame is provided, the method comprising: determining a texture saliency value for a first block in the left view frame by intra prediction; determining a motion saliency value for the first block by motion estimation; determining a disparity saliency value between the first block and a corresponding second block in the right view frame; and determining a quantization parameter based on the disparitysaliency value, the texture saliency value, and the motion saliency value.

Preferably, the method further comprises performing quantization of the first block in accordance with the quantization parameter.

Preferably, the method further comprises determining a hybrid stereo saliency map for the left view frame; downscaling the hybrid stereo saliency map to match the dimension of a transform unit (TU); determining a second quantization parameter for the transform unit; and performing quantization of the transform unit in accordance with the second quantization parameter.

Preferably, the method further comprises determining the texture saliency value based on output of a DC mode intra prediction in high efficiency video coding (HEVC).

Preferably, the method further comprises determining a motion saliency value for the first block based on output of motion estimation in high efficiency video coding (HEVC).

Preferably, the method further comprises determining the hybrid stereo saliency value for the first block by superposing the disparity saliency value, the texture saliency value, and the motion saliency value with weighting parameters.

Preferably, the left view frame and the right view frame are rectified in a first direction, and the method further comprises searching the disparity saliency value in a second direction perpendicular to the first direction.

Preferably, the disparity saliency value comprises a non-integer value.

Preferably, the method further comprises determining the disparity saliency value based on quarter-pixel samples generated by sub-pixel motion estimation in high efficiency video coding (HEVC).

In accordance with embodiments of the present invention, a region of interest based video coding scheme using a visual attention-based bit allocation strategy is provided. In particular, spatial, temporal and stereo cues are considered in video attention prediction. The spatial and temporal contrast features are directly extracted from existing video encoding processes without introducing any extra computation, and sub-pixel disparity intensity estimation is used to improve the visual saliency accuracy. Thus, the stereo video can be compressed efficiently without affecting end-user's perceptional quality.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. It is obvious that the draws are but for exemplary embodiments of the present invention, and that a person of ordinary skill in the art may derive additional draws without deviating from the principles of the present invention.

In accordance with embodiments of the present invention, a panoramic stereo video system including multi-camera video capturing, data processing, stereo video coding, transmission, and 3D displaying is provided. The panoramic stereo video system employs real-time multi-view videos capturing, image rectification and pre-processing, and region of interest (ROI) based stereo video compression. After the transmission and decoding process, a head-mounted display (HMD) headset is used to display the left and right views.

1. System Overview

Figure 1:
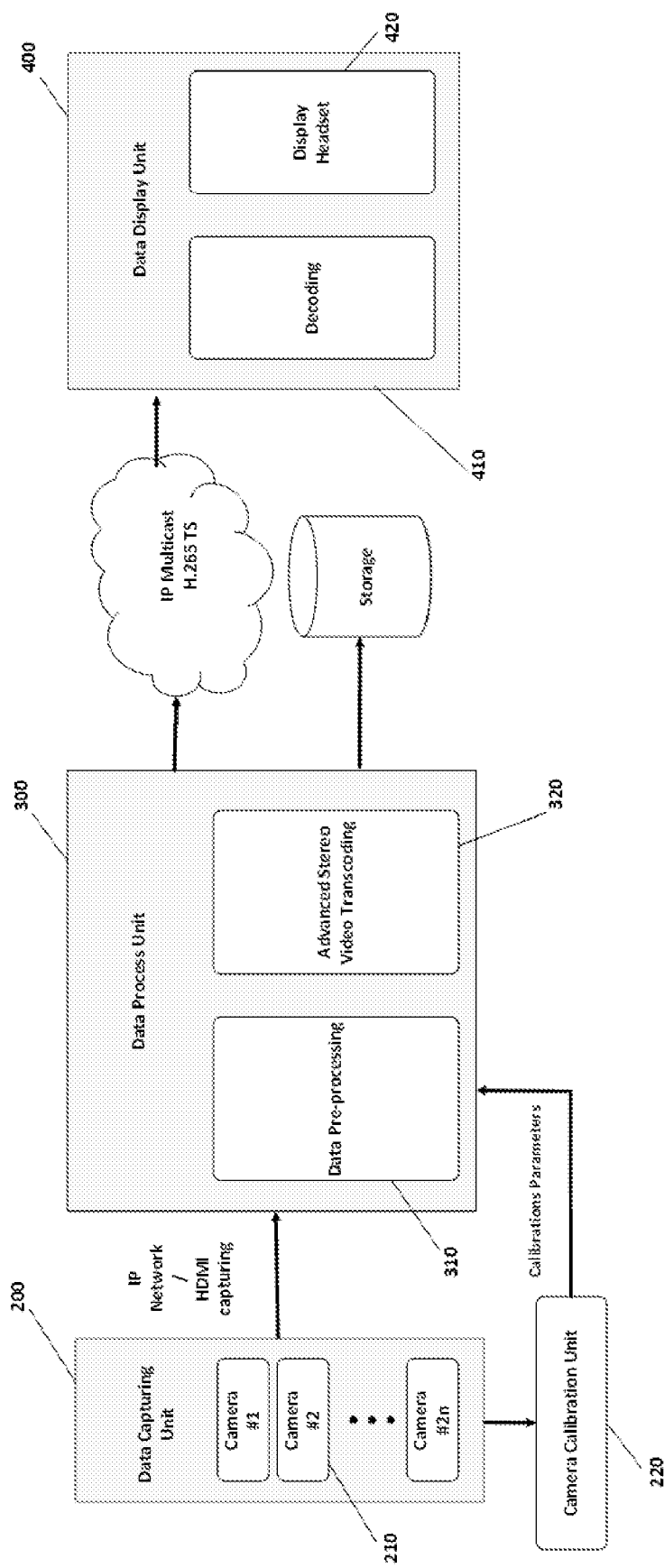
FIG. 1 is an exemplary schematic diagram for a panoramic stereo video system in accordance with an embodiment of the present invention.

FIG. 1 is an exemplary schematic diagram for a panoramic stereo video system in accordance with an embodiment of the present invention. The panoramic stereo video system 100 uses a camera array to capture 3D panoramic video, and displays the captured 3D panoramic video on either a 3D TV or a head-mounted virtual reality display device. As shown in FIG. 1, the panoramic stereo video system 100 includes a data capturing unit 200, a data processing unit 300, and a data display unit 400. The data capturing unit 200 includes a plurality of cameras in a camera array 210, and a camera calibration unit 220. The data processing unit 300 includes a data pre-processing unit 310 and an advanced stereo video transcoding unit 320. The data display unit 400 includes a decoding unit 410, and a display headset 420.

2. Data Capturing Unit

As shown in FIG. 1, the data capturing unit 200 includes a plurality of cameras in a camera array 210, and a camera calibration unit 220 for calibrating the camera array 210.

2.1. Camera Array

Figure 2:
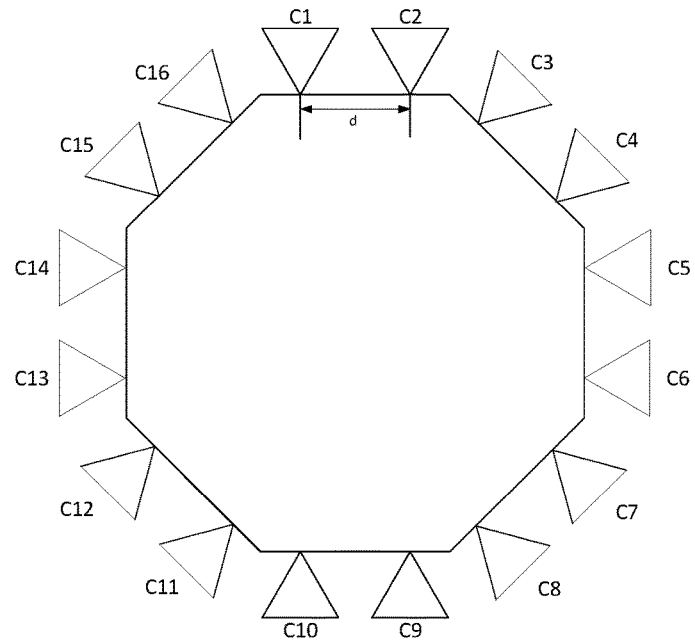
FIG. 2 is an exemplary schematic diagram for a camera array in the panoramic stereo video system in accordance with an embodiment of the present invention.

FIG. 2 is an exemplary schematic diagram for a camera array in the panoramic stereo video system in accordance with an embodiment of the present invention.

As shown in FIG. 2, the camera array 210 has 16 high-definition cameras c1-c16 installed on a mounting frame in the shape of a regular octagon, with a pair of cameras placed on each side of the octagon. The two cameras on each side, such as c1 and c2, have parallel optical axes, and are separated by a distance d. The raw video data captured by the camera array 210 is transmitted through cable to a computer for further processing. The parameters for the camera are listed in Table 1 below.

TABLE 1

| | |
|---|---|
| Sensor | OV2710 |
| Sensor Size | 1/2.7 inch |
| Pixel Size | 3 * 3 |
| Image Area | 5856 * 3276 |
| Resolution | FULL HD 1920(H) * 1080(V) |
| Frame | MJPEG@30 fps |
| USB protocol | USB2.0 HS/FS |
| AEC | Support |
| AEB | Support |
| AGC | Support |
| Lens Parameter | Standard 2.1 mm, optional/2.5/2.8/3.6/6 mm/FOV(D) 170 Degree/187 Degree |

It should be noted that while the camera array is depicted as a regular octagon in FIG. 2, the camera array can be configured in other shapes in accordance with other embodiments of the present invention. Specifically, in one embodiment of the present invention, the cameras are installed on a rigid frame, so that the relative positions among the plurality of cameras are substantially constant. In another embodiment of the present invention, the cameras are located substantially on the same plane, such as on the sides of a polygon.

2.2. Camera Calibration

To stitch images captured by the cameras together and generate 3D effects, it is necessary to obtain both the internal and parameters of the cameras. The extrinsic parameters include the rotation and translation among the cameras, so that the images captured by different cameras can be rectified and aligned in the horizontal direction. Also, there may be distortions in the images captured by the cameras, and to obtain images free of the distortions, it is necessary to know the camera distortion parameters. These parameters are obtained during the camera calibration process.

2.2.1. Calibration of Internal and Distortion Parameters

The internal and distortion parameters of the cameras can be obtained using a variety of methods, such as the calibration method proposed by Zhengyou Zhang, and tools like MatLab can be employed to obtain these parameters.

2.2.2. Calibration of Extrinsic Parameters

After obtaining the internal parameters of the cameras, a method based on structure from motion is employed to obtain the rotations and translations among the cameras. This method has the following advantages.

Efficiency: there is no need to calibrate the cameras pair by pair. Rather, all cameras capture videos of a scene simultaneously during calibration, and the extrinsic parameters for all the cameras can be obtained at the same time.

Accuracy: in pattern-based calibration methods, the pattern needs to be captured by two adjacent cameras, which often results in lower resolution for the pattern and reduces the accuracy of the calibration. In our structure from motion based method, the movement of each camera will be estimated independently to obtain the parameters, and there is no need for adjacent cameras to have an overlapping field of view. Thus, we can place the cameras closer to the scene to be captured to achieve better accuracy.

Extensibility: since our method does not require an overlapping field of view for adjacent cameras, it is even applicable to cameras placed in back-to-back positions.

2.3. Data Capturing Method

Data from the 16 cameras are captured and stored using software, and then provided to the data processing unit. Image data for each frame captured by the cameras can be collected using software such as FFmpeg and DirectShow (or DShow). The frames captured by each camera are compressed and then stored as video files. Since there are a number of cameras, the frames captured by the cameras need to be synchronized, such as using time stamps. For example, each frame captured by the cameras can be affixed with a time stamp, and placed in a queue so that it is synchronized with other frames with the same time stamp. The synchronized frames are coded into video streams, and stored locally or transmitted through the network together.

3. Data Processing Unit

As shown in FIG. 1, the data processing unit 300 includes data pre-processing unit 310 and an advanced stereo video transcoding unit 320.

Figure 3:
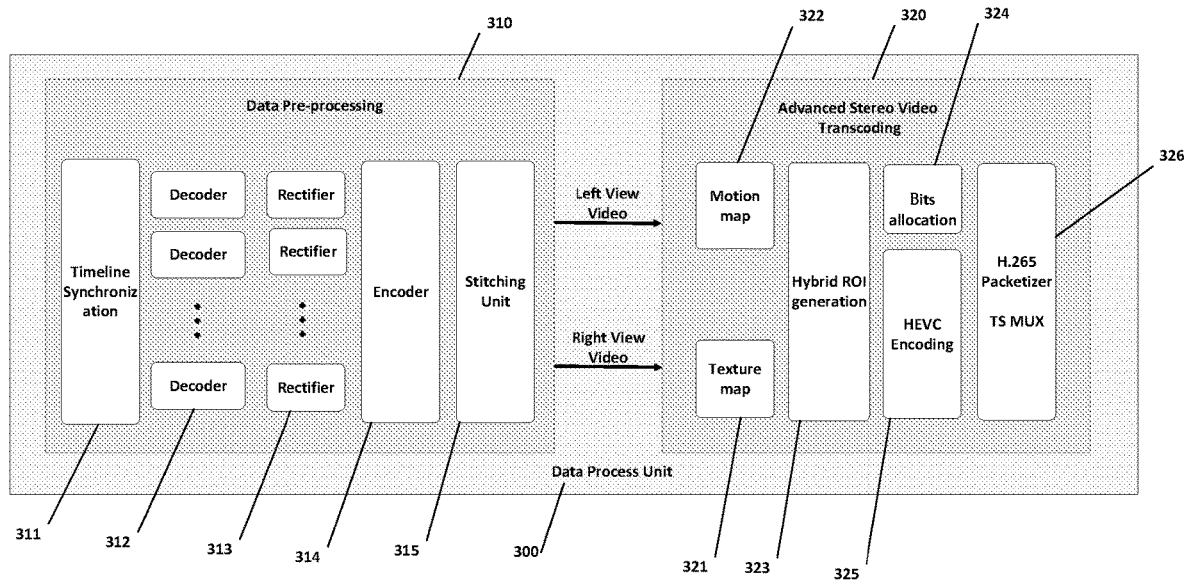
FIG. 3 is an exemplary schematic diagram for a data processing unit in a panoramic stereo video system in accordance with an embodiment of the present invention.

FIG. 3 is an exemplary schematic diagram for a data processing unit in a panoramic stereo video system in accordance with an embodiment of the present invention. As shown in FIG. 3, the data pre-processing unit 310 includes a timeline synchronization 311 for synchronizing the images captured by the cameras, a number of decoders 312 for decoding streams of raw video, a number of rectifiers 313 for rectifying the raw video, an encoder 314 for video processing, including noise reducing and editing, a stitching unit for stitching videos to generate panoramic video. The data pre-processing unit 310 outs a left view video and a right view video to the advanced stereo video transcoding unit 320. The advanced stereo video transcoding unit 320 generates a motion map 321 and a texture map 322 for the video, and a hybrid region of interest (ROI) generating unit 323 identifies regions of interests in the videos based on the motion map and 321 the texture map 322. A bits allocation unit 324 allocates bits based on the identified region of interests, and a HEVC encoding unit 325 encodes the videos. A H.265 packetizer 326 packs the encoded videos for transmission.

Figure 4:
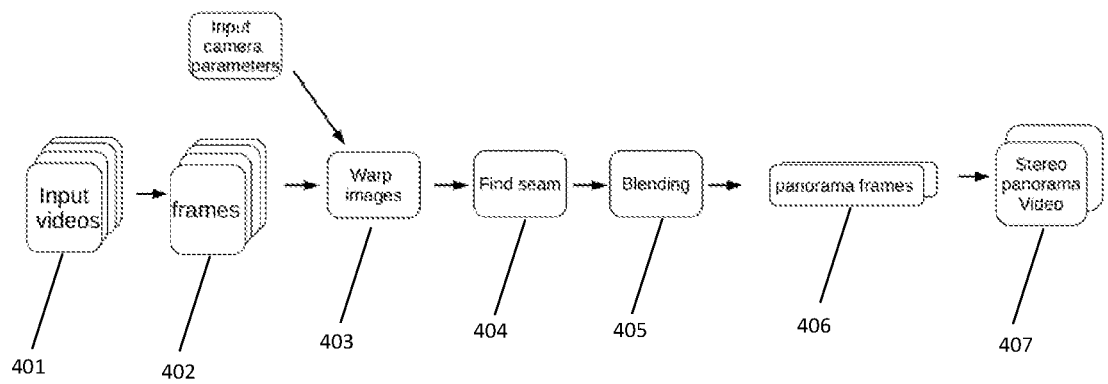
FIG. 4 is an exemplary flowchart for a method of stitching a panoramic stereo video in accordance with an embodiment of the present invention.

FIG. 4 is an exemplary flowchart for a method of stitching a panoramic stereo video in accordance with an embodiment of the present invention.

3.1 Distortion Correction and Preprocessing

The frames captured by the cameras are warped in accordance with the distortion parameters obtained during the calibration process to obtain frames free of distortions. In order to enhance the accuracy of image alignment and stitching, the frames are filtered first to reduce noises.

3.2. Image Alignment

Image alignment is performed on each pair of cameras located on each side of the octagon, and the images captured by each pairs of cameras are aligned in the horizontal direction. In accordance with an embodiment of the present invention, each frame captured by the pairs of cameras is warped to a plane that is parallel to the optical axes of the fair of cameras.

4. Panoramic Video Stitching

The camera array has 8 pairs of cameras. The frames captured by all the left cameras are projected onto a cylinder, and then stitched into a panoramic image. A panoramic video can be obtained by repeating the above steps for all the frames captured by the left cameras. Another panoramic video can be obtained by processing the frames captured by the right cameras in the same fashion. These two panoramic videos form a panoramic stereo video.

5. Data Display Unit

As shown in FIG. 1, the data display unit 400 includes a decoding unit 410, and a display headset 420. After going through an encoding and decoding system, the panoramic stereo video is played on display headset 420, which can be a wearable virtual reality (VR) equipment, such as one provided by Oculus VR. The panoramic stereo video is rendered respectively to the left display and the right display of the Oculus device. The display area of the panoramic stereo video can be adjusted in accordance with the movement of the detection device to simulate the change in perspective in the virtual reality.

Figure 5:
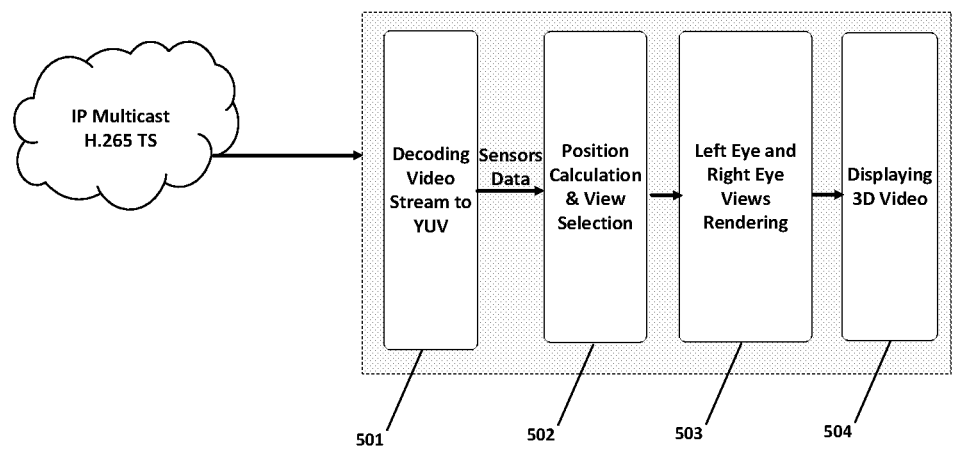
FIG. 5 is an exemplary flowchart for a method of displaying a panoramic stereo video in accordance with an embodiment of the present invention.

FIG. 5 is an exemplary flowchart for a method of displaying a panoramic stereo video in accordance with an embodiment of the present invention. As shown in FIG. 5, in step 501, the encoded video stream is first decoded to YUV. In step 502, position calculation and view selection are made in accordance with the Oculus sensors data. In step 503, the images for the left eye and the right eye are respectively rendered. In step 504, the rendered images are displayed on the Oculus display headset.

6. Stereo Video Compression

In the stereo panorama video system, left and right super-resolution videos are stitched in the video processing module. As a result, huge amount of video data bring challenge for video compression and transmission. In accordance with embodiments of the present invention, a region of interest based video coding scheme using a visual attention-based bit allocation strategy is provided. In particular, spatial, temporal and stereo cues are considered in video attention prediction. The spatial and temporal contrast features are directly extracted from video encoding process, and no extra computation is introduced. Also, sub-pixel disparity intensity estimation is used to improve the visual saliency accuracy in the stereo system. Both sub-pixel sample reusing and block-based matching ensuing the proposed algorithm performs the detection in real-time with good performance. The overall scheme highly improves video compression rate without affecting end-user's perceptional quality.

6.1 Region of Interest Detection 6.1.1 Spatial Feature Extraction from Intra Prediction In HEVC coding standard, intra prediction (or spatial prediction) is used for coding blocks that need to be compressed independent of previously coded frames. The spatial correlation at pixel level is exploited by using the neighboring samples of previously encoded and reconstructed blocks. Then the predicted sample is subtracted from the original pixel values to create a residual block. The residual contains texture contrast information, and we use the residual obtained from intra prediction to generate the spatial saliency map.

Figure 6:
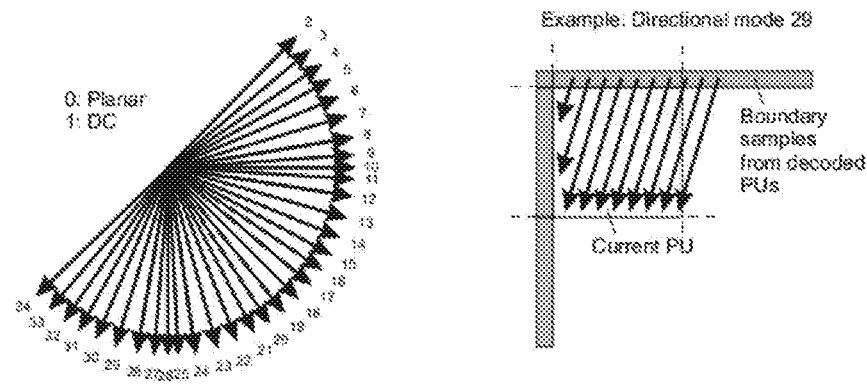
FIG. 6 is an exemplary schematic diagram for spatial prediction modes in HEVC in accordance with an embodiment of the present invention.

In HEVC video coding, spatial prediction includes 33 directional modes (compared to eight such modes in H.264), DC (overall averaging) and planar (surface fitting) prediction modes, which is selected per Prediction Unit (PU). FIG. 6 is an exemplary schematic diagram for spatial prediction modes in HEVC in accordance with an embodiment of the present invention. All the 35 prediction modes are shown in FIG. 6. The HEVC PU size is selected from 64×64 to 8×8, and all the 35 modes can be used to obtain the optimal block partition and residual. To reduce complexity, in one embodiment, the block-based residual map reuses the results generated by DC mode prediction on fixed 8×8 blocks. The residual of block k is calculated as follow:

$$res_k = \Sigma_{i=1}^{8} \Sigma_{j=1}^{8} (C_{ij} - R_{ij})^2 \quad (1)$$

where $C_{ij}$ and $R_{ij}$ are the (i, j)th elements of the current original block C and the reconstructed block R. Then the texture saliency value $S_T$ for each block can be computed based on its residual, and normalized into [0,1]

$$S_T(k) = \frac{res_k}{\Sigma_{i=1}^{N} res_i} \quad (2)$$

where N is the number of blocks in a frame. Since the 8×8 block spatial residual detection is conducted in HEVC intra prediction process, no extra computation is introduced.

In other embodiments, each frame can be divided into non-overlapped blocks of a different size, such as 64×64 or 16×16 pixels; the texture saliency map can be calculated based on the results of other video coding process that is similar or comparable to intra prediction; and the compression can be based on other coding standards, such as H.264/AVC or AVS. Preferably, the intra prediction or other video process is based on the same block size that the frame is divided into.

6.1.2 Temporal Feature Extraction from Motion Estimation

A fast moving object draws visual attention. However, since a video sequence is captured by a moving camera, there exists a global motion. Thus, we need to measure the local motion salient by estimating motion vector difference (MVD), which is the output of motion estimation process in inter prediction of HEVC.

The motion estimation techniques in most video coding standards are typically based on block matching, where the motion vector is represented by a 2D translational model. Each block is matched with all candidate positions within a defined search region. Since motion vectors for neighboring blocks are often highly correlated, HEVC employs the motion vector prediction technique, which predicts the current block's motion vector from the motion vectors of nearby, and previously coded blocks.

Figure 7:
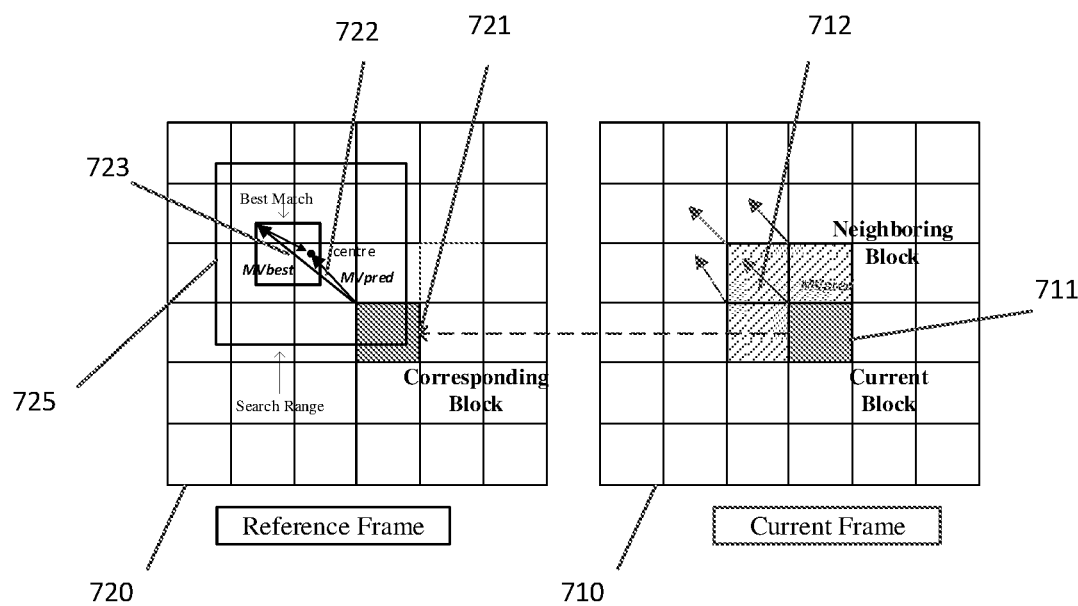
FIG. 7 is an exemplary schematic diagram for block-based motion estimation with MV prediction in accordance with an embodiment of the present invention.

FIG. 7 is an exemplary schematic diagram for block-based motion estimation with MV prediction in accordance with an embodiment of the present invention. As shown in FIG. 7, a vector $mv_{pred}$ 712 is predicted based on the motion vectors of the neighboring blocks for the current block 711 in current frame 710. The corresponding block 721 is matched with all candidate positions within a defined search region 725. Finally, the difference between the best vector $mv_{best}$ 723 and the predicted vector $mv_{pred}$ 721 is encoded and transmitted.

In one embodiment, the MVD generated by 8×8 block motion estimation is used. The magnitude of motion difference can be defined as:

$$MVD_k = \|mv_{best}(k) - mv_{pred}(k)\| \quad (3)$$

Then, the motion saliency map $S_M$ can be calculated by normalizing the MVD in same frame:

$$S_M(k) = \frac{MVD_k}{\Sigma_{i=1}^{N} MVD_i} \quad (4)$$

Figure 8:
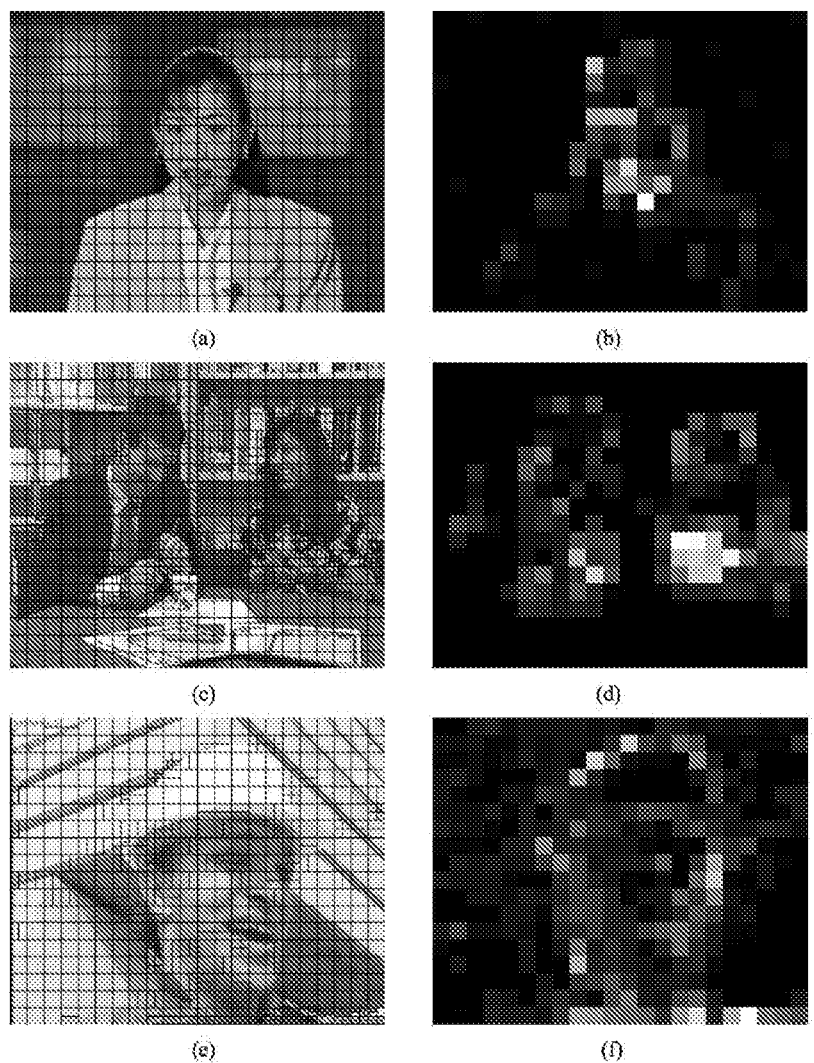
FIG. 8 is an exemplary schematic diagram for a motion intensity map acquired from motion estimation in accordance with an embodiment of the present invention.

The motion saliency map can be computed according to the results of motion estimation, which is an essential process in HEVC video coding. Thus, this method can extract the motion features without introducing any extra processing. FIG. 8 is an exemplary schematic diagram for a motion intensity map acquired from motion estimation in accordance with an embodiment of the present invention.

In other embodiments, each frame can be divided into non-overlapped blocks of a different size, such as 64×64 or 16×16 pixels; the motion saliency map can be calculated based on the results of other video coding process that is similar or comparable to motion estimation in inter prediction; and the compression can be based on other coding standards, such as H.264/AVC or AVS. Preferably, the motion estimation or other video process is based on the same block size that the frame is divided into.

6.1.3 Disparity Estimation from Disparity Prediction

We also explore stereopsis for saliency analysis, which provides an additional depth cue and plays an important role in the stereo panorama videos. A block based disparity estimation method is introduced to handle disparity map.

Figure 9:
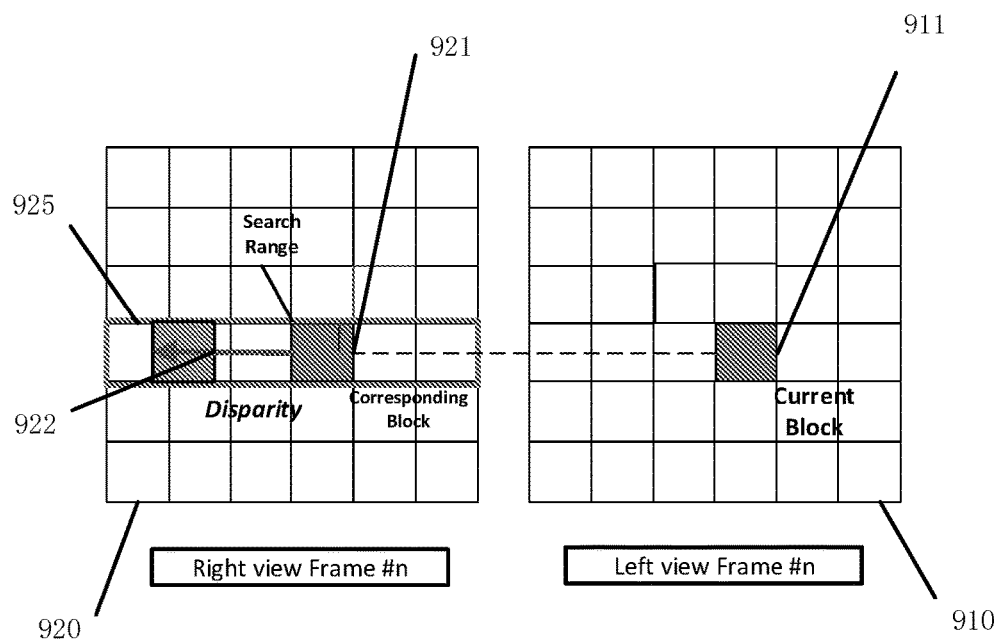
FIG. 9 is an exemplary schematic diagram for block-based disparity estimation for stereo video coding in accordance with an embodiment of the present invention.

FIG. 9 is an exemplary schematic diagram for block-based disparity estimation for stereo video coding in accordance with an embodiment of the present invention. As shown in FIG. 9, in the high-resolution video system, the left view 910 and the right view 920 of the stereoscopic image are well rectified. Each view is divided into non-overlapped blocks of size of 8×8 pixels, and all pixels within a block assume to have same disparity. As a result, blocks of the right view of matching blocks of the left view are expected to be found in the same scan lines, and disparity 922 is a one-dimension vector (the vertical components is equal to zero). The disparity matching scheme is similar as the motion estimation in inter prediction. In particular, searching area 925 is limited only in horizontal direction with range of ±32. The initial search position is set as the position of the corresponding block 921 in the right view 920. The sum of absolute difference (SAD) is employed as the matching criterion.

In order to provide better prediction accuracy, disparities with non-integer values are also considered and sub-pixel intensities are interpolated using HEVC 7-8 tap filter. Since the sub-pixel samples interpolation is one of most complex-operations, the proposed sub-pixel disparity search directly uses the quarter-pixel samples generated by HEVC sub-pixel motion estimation. The reuse of HEVC's 7-tap interpolation greatly reduces the computational complexity. The block-wise disparity map is generated according to block's disparity value $d_k$:

$$S_D(k) = \frac{\|d_k\|}{\sum_{i=1}^{N} \|d_i\|} \quad (5)$$

In other embodiments, each frame can be divided into non-overlapped blocks of a different size, such as 64×64 or 16×16 pixels; the disparity map can be calculated using the results of other video coding process that is similar or comparable to motion estimation; and the compression can be based on other coding standards, such as H.264/AVC or AVS. Preferably, the motion estimation process is based on the same block size that the frame is divided into.

6.1.4 Hybrid ROI Determination

In one embodiment, the region of interest is detected by combing the spatiotemporal and disparity features: the texture contrast $S_T$ in (2), the motion contrast $S_M$ in (4) and the disparity intensity in (5). While each feature has its own strength and weakness, the combination of all the features provides the optimal results. First, each feature map is normalized to have the range of [0,1]. Second, a hybrid stereo saliency map S is formed by superposing $S_M$, $S_T$ and $S_D$.

$$S(b_i) = \lambda_T S_T + \lambda_M S_M + \lambda_D S_D \quad (6)$$

where $\lambda_T$, $\lambda_M$ and $\lambda_D$ are weighting parameters.

Figure 10:
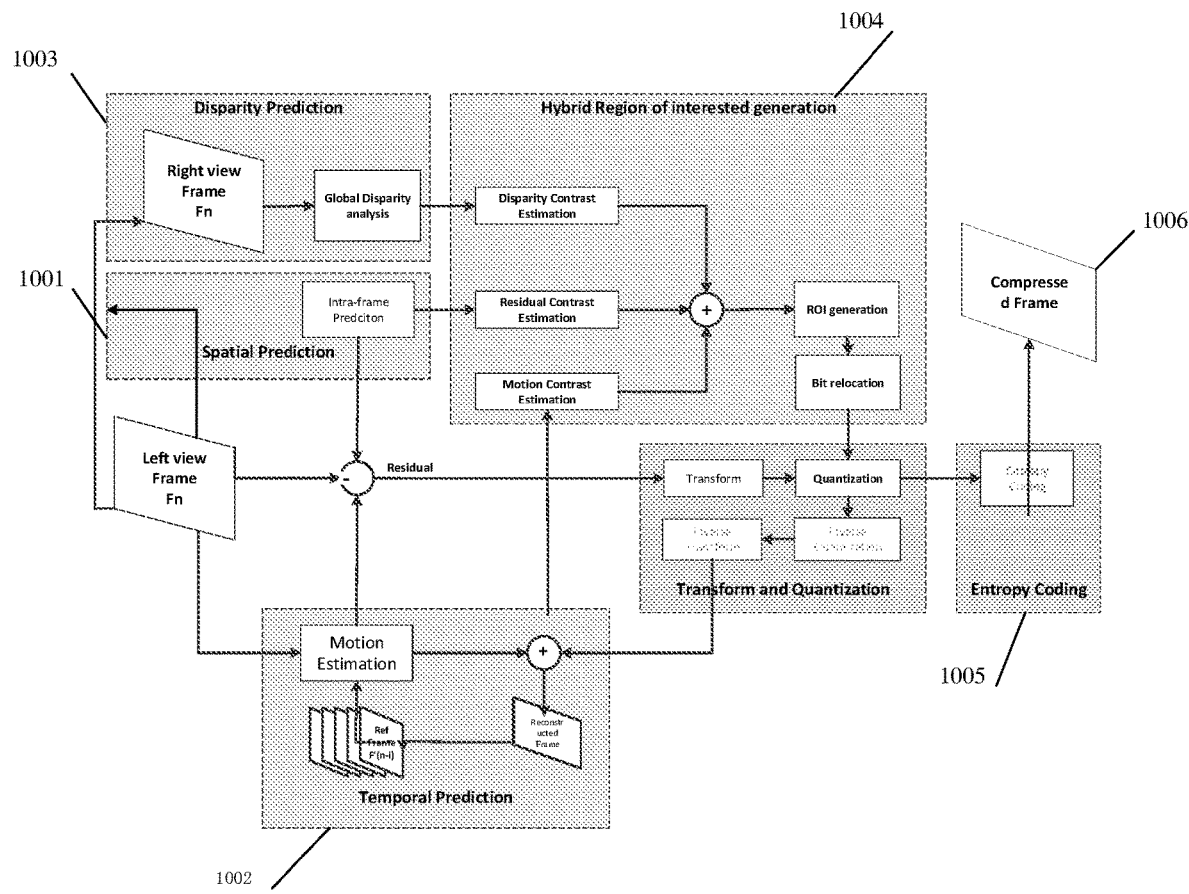
FIG. 10 is an exemplary schematic diagram for the hybrid ROI based stereo video compression system in accordance with an embodiment of the present invention.

FIG. 10 is an exemplary schematic diagram for the hybrid ROI based stereo video compression system in accordance with an embodiment of the present invention. As shown in FIG. 10, the stereo video compression system has a spatial prediction module 1001, a temporal prediction module 1102, and a disparity prediction module 1103. The results generated by the spatial prediction module 1001, the temporal prediction module 1102, and the disparity prediction module 1103 are inputted to a hybrid region of interest generation module 1004, which identified the salient regions, and allocate the bits accordingly. The transformation and quantization module 1105 performs quantization based on the bits allocation determined by the hybrid region of interest generation module 1004, and the entropy coding module 1106 coding the frames to generated compressed frames 1006.

6.2 ROI Based Stereo Video Coding

One of the ideas for ROI-based compression is bit allocation in favor of salient regions. The hybrid ROI detection approach generates a high quality and accurate saliency map. Furthermore, to improve video compression performance, the advanced video standard HEVC is chosen for its high compression efficiency.

Since our ROI detection is 8×8 block-based, the estimated saliency map needs to be downscaled to match the dimensions of current Transform Unit, which may be chosen as 32×32, 16×16 and 8×8. The new QP values can be computed using the following equation:

$$Q' = \max(Q - \psi \cdot (S - ES), 0) \quad (8)$$

where $Q \in \mathbb{R}$ is the original QP values selected by x265 encoder, and S: $\mathbb{R}^2 \to [0; 1]$ is a downscaled saliency map for the current frame.

Thus, the QP value for coding unit containing salient regions is reduced, while the QP value for coding unit not containing salient regions is increased. The parameter $\psi$ can be selected by user, and controls bitrate distribution between salient and non-salient regions: the greater the value of $\psi$, more bits for salient regions.

Figure 11:
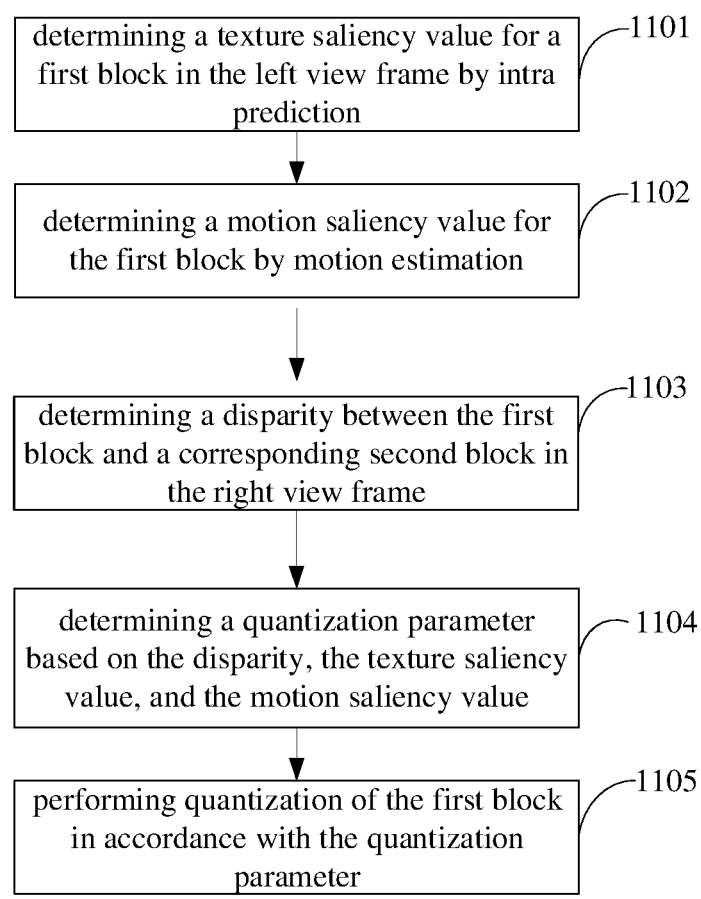
FIG. 11 is an exemplary flowchart for the hybrid ROI based stereo video compression method in accordance with an embodiment of the present invention.

FIG. 11 is an exemplary flowchart for the hybrid ROI based stereo video compression method in accordance with an embodiment of the present invention. As shown in FIG. 11, the compression method includes the following steps.

Step 1101: determining a texture saliency value for a first block in the left view frame by intra prediction. Preferably, the texture saliency value is determined based on output of a DC mode intra prediction in high efficiency video coding (HEVC).

Step 1102: determining a motion saliency value for the first block by motion estimation. Preferably, the motion saliency value is determined based on output of motion estimation in high efficiency video coding (HEVC).

Step 1103: determining a disparity between the first block and a corresponding second block in the right view frame. Preferably, the left view frame and the right view frame are rectified in a first direction, and the disparity is searched in a second direction perpendicular to the first direction.

Step 1104: determining a quantization parameter based on the disparity, the texture saliency value, and the motion saliency value. Preferably, a hybrid stereo saliency value is determined by superposing the disparity, the texture saliency value, and the motion saliency value with weighting parameters.

Step 1105: performing quantization of the first block in accordance with the quantization parameter. Here, if the block size is different from the size of the current transform unit, the hybrid stereo saliency map is downscaled to match the dimensions of current Transform Unit, and a new quantization parameter is calculated.

In accordance with embodiments of the present invention, a region of interest based video coding scheme using a visual attention-based bit allocation strategy is provided. In particular, spatial, temporal and stereo cues are considered in video attention prediction. The spatial and temporal contrast features are directly extracted from existing video encoding processes without introducing any extra computation, and sub-pixel disparity intensity estimation is used to improve the visual saliency accuracy. Thus, the stereo video can be compressed efficiently without affecting end-user's perceptional quality.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method of compressing a stereoscopic video comprising a left view frame and a right view frame, the method comprising:
   determining a texture saliency value for a first block in the left view frame by intra prediction;
   determining a motion saliency value for the first block by motion estimation in inter prediction;
   determining a disparity saliency value between the first block and a corresponding second block in the right view frame;
   determining a quantization parameter based on the disparity saliency value, the texture saliency value, and the motion saliency value;
   performing quantization of the first block in accordance with the quantization parameter;
   determining a hybrid stereo saliency value for the first block by superposing the disparity saliency value, the texture saliency value, and the motion saliency value with weighting parameters;
   determining a hybrid stereo saliency map for the left view frame;
   in response to a size of the first block is different from a size of a transform unit, downscaling the hybrid stereo saliency map to match the dimensions of the transform unit;
   determining a second quantization parameter for the transform unit; and
   performing quantization of the transform unit in accordance with the second quantization parameter.

2. The method of claim 1, further comprising:
   determining the texture saliency value based on output of a DC mode intra prediction in high efficiency video coding (HEVC).

3. The method of claim 1, further comprising:
   determining a motion saliency value for the first block based on output of motion estimation in high efficiency video coding (HEVC).

4. The method of claim 1, wherein the left view frame and the right view frame are rectified in a first direction, and the method further comprising:
   searching the disparity saliency value in a second direction perpendicular to the first direction.

5. The method of claim 4, wherein the disparity saliency value comprises a non-integer value.

6. The method of claim 5, further comprising:
   determining the disparity saliency value based on quarter-pixel samples generated by sub-pixel motion estimation in high efficiency video coding (HEVC).

7. A method of compressing a stereoscopic video comprising a left view frame and a right view frame, the method comprising:
   determining a texture saliency value for a first block in the left view frame by intra prediction;
   determining a motion saliency value for the first block by motion estimation in inter prediction;
   determining a disparity saliency value between the first block and a corresponding second block in the right view frame;
   determining a quantization parameter based on the disparity saliency value, the texture saliency value, and the motion saliency value;
   performing quantization of the first block in accordance with the quantization parameter,
   wherein the left view frame is divided into a plurality of non-overlapping blocks, and the motion estimation is based on a same size as the first block;
   determining a hybrid stereo saliency map for the left view frame;
   in response to a size of the first block is different from a size of a transform unit, downscaling the hybrid stereo saliency map to match the dimensions of the transform unit;
   determining a second quantization parameter for the transform unit; and performing quantization of the transform unit in accordance with the second quantization parameter.

8. A non-transitory computer-readable medium having stored thereon computer-executable instructions, said computer-executable instructions comprising a method of compressing a stereoscopic video comprising a left view frame and a right view frame, the method comprising:
- determining a texture saliency value for a first block in the left view frame by intra prediction;
- determining a motion saliency value for the first block by motion estimation;
- determining a disparity saliency value between the first block and a corresponding second block in the right view frame;
- determining a quantization parameter based on the disparity saliency value, the texture saliency value, and the motion saliency value;
- performing quantization of the first block in accordance with the quantization parameter;
- determining a hybrid stereo saliency value for the first block by superposing the disparity saliency value, the texture saliency value, and the motion saliency value with weighting parameters;
- determining a hybrid stereo saliency map for the left view frame;
- in response to a size of the first block is different from a size of a transform unit, downscaling the hybrid stereo saliency map to match the dimensions of the transform unit;
- determining a second quantization parameter for the transform unit; and
- performing quantization of the transform unit in accordance with the second quantization parameter.

9. The computer-readable medium of claim 8, the method further comprising:
- determining the texture saliency value based on output of a DC mode intra prediction in high efficiency video coding (HEVC).

10. The computer-readable medium of claim 8, the method further comprising:
- determining a motion saliency value for the first block based on output of motion estimation in high efficiency video coding (HEVC).

11. The computer-readable medium of claim 8, wherein the left view frame is divided into a plurality of non-overlapping blocks, and the motion estimation is based on a same size as the first block.

12. The computer-readable medium of claim 8, wherein the left view frame and the right view frame are rectified in a first direction, and the method further comprising:
- searching the disparity saliency value in a second direction perpendicular to the first direction.

13. The computer-readable medium of claim 12, wherein the disparity saliency value comprises a non-integer value.

14. The computer-readable medium of claim 13, the method further comprising:
- determining the disparity saliency value based on quarter-pixel samples generated by sub-pixel motion estimation in high efficiency video coding (HEVC).

* * * * *